Figure 1:
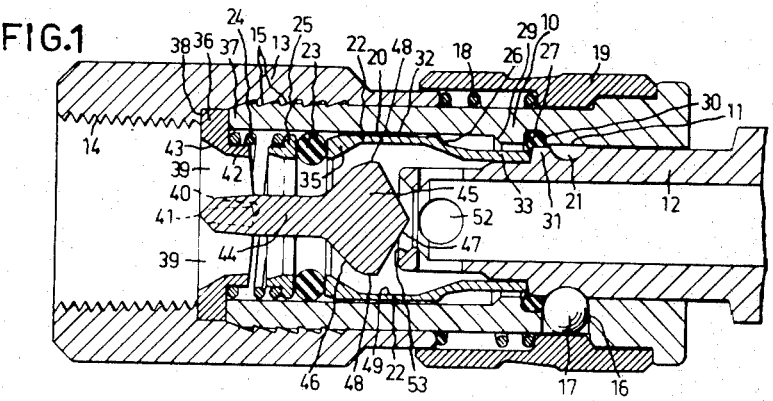

United States Patent
Nyberg

[15] 3,650,507
[45] Mar. 21, 1972

[54] COUPLING SLEEVE FOR COUPLING ENGAGEMENT WITH A NIPPLE

[72] Inventor: Carl Erik Josef Nyberg, Sylvens vag 6, Skovde, Sweden

[22] Filed: Mar. 11, 1970

[21] Appl. No.: 18,474

[30] Foreign Application Priority Data

Mar. 14, 1969 Sweden..................................3568/69

[52] U.S. Cl............................................................251/149.6
[51] Int. Cl................................................................F16l 37/28
[58] Field of Search ................251/149, 149.1, 149.5, 149.6, 251/149.7, 149.8, 149.9; 137/614.03, 614.04, 614.05

[56] References Cited

UNITED STATES PATENTS

| 2,951,713 | 9/1960 | Hoffstrom | 137/614.03 |
| 2,648,548 | 8/1953 | Scheiwer | 137/614.03 |
| 3,201,151 | 8/1965 | Westveer | 137/614.04 X |

FOREIGN PATENTS OR APPLICATIONS

| 555,692 | 9/1943 | Great Britain | 137/614.03 |

Primary Examiner—William R. Cline
Attorney—Bauer and Goodman

[57] ABSTRACT

A coupling sleeve for coupling engagement with a nipple to form a quick-coupling between two gas or liquid carrying conduits, the coupling sleeve and its internal separate details being so adapted that all details may be inserted from one and the same end of the sleeve.

5 Claims, 5 Drawing Figures

Patented March 21, 1972  3,650,507

COUPLING SLEEVE FOR COUPLING ENGAGEMENT WITH A NIPPLE

The present invention relates to a coupling sleeve adapted for coupling engagement with a nipple, to form a quick-coupling between two gas or liquid carrying conduits, the end portion of the sleeve facing the nipple being provided with means for locking the nipple in its inserted position. The locking means suitably comprises a number of latching balls disposed in radial bores in the end portion of the sleeve facing the nipple and adapted to lockingly engage in an annular groove arranged on the nipple.

Couplings of this type are being used to an ever increasing extent for the purpose of connecting together, for example, compressed air lines pressurized liquid lines and the like. And because such couplings are produced in very large numbers, it is highly essential that the design of the component members and their mutual combination ability is such as to enable the relatively simple and rapid manufacture and assembly of said members. This primarily concerns the coupling sleeve, since normally the nipple presents no great problem in this respect. It is also necessary to maintain a satisfactory degree of precision and to reach a design of the coupling sleeve whereby the intercooperation of its component parts and the cooperation of the sleeve with the nipple structure provides an effective seal, both when the nipple is inserted into and withdrawn from the coupling sleeve.

A large number of couplings of different construction have been designed for the purpose of fulfilling this desideratum to the highest possible extent.

When contemplating improvements attention should therefore be paid to the fact that a large number of coupling sleeves and nipples are already in operation, which together form couplings which, from a practical and economic point of view, should not be changed in their entirety for a sleeve and nipple of novel construction. The necessary compromise is one of progressive improvement in the design of present day coupling sleeves and nipples, in a manner whereby a new and improved coupling sleeve, for example, can be made to fit existing nipples. It is obvious that such conditions greatly restrict the scope of possible improvement. The improvements which can be made consequently often seem of a small nature. Nevertheless, the significance of such improvements grows enormously when viewed against the background of mass production. Each gain in material costs, time consumed in manufacture and assembly, useful life and reliability etc. can be multiplied by a factor usually in the region of many hundreds of thousands.

Against this background, the novel coupling sleeve of the present invention has been given the characteristic features recited in the attached claims.

A number of the component parts of the sleeve can be precision moulded to advantage in plastic. The component parts or elements are constructed so that they can be assembled in series, by inserting one in the other. In this way, mechanical working is reduced and assembly made easier. If latching balls are used to lock the nipple, the work of forming the ball-accomodating radial bores in the sleeve is easily accomplished. No seals other than O-rings of standard design need be used. Because the flow-through passage is relatively straight, only relatively low flow losses occur, and these can be reduced further by using known nipples of the type which present one single axial end opening.

Figure 2:
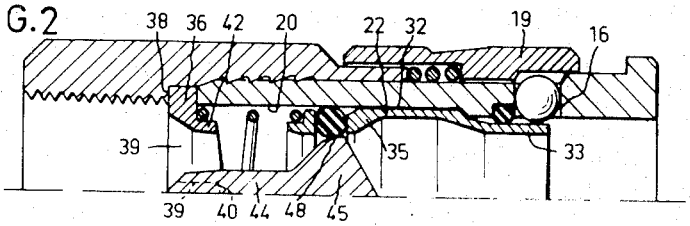
Figure 3:
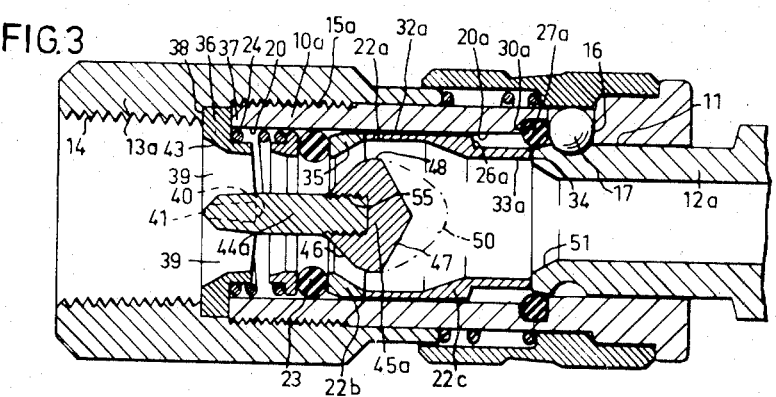
Figure 4:
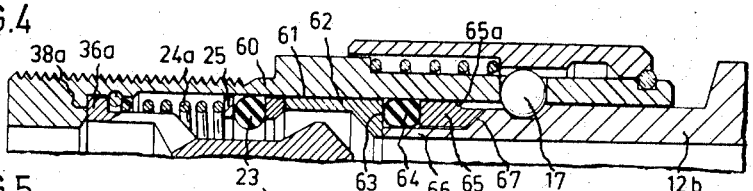
Figure 5:
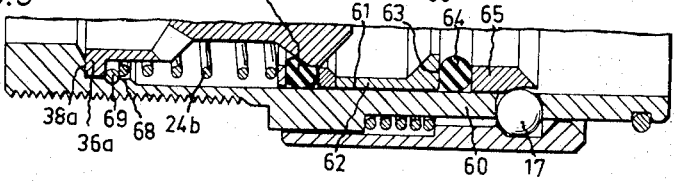

These and other elements and advantages characteristic of the invention will now be described in more detail with reference to embodiments of the coupling sleeve of the invention illustrated in the drawing, in which FIG. 1 is a longitudinal section through one embodiment of the coupling sleeve of the present invention, connected to a nipple of conventional standard design, FIG. 2 shows half the coupling sleeve in closed position subsequent to removing the nipple. FIG. 3 shows a modified embodiment of the coupling sleeve with a suitable construction for obtaining reduced losses in flow, FIG. 4 shows a simplified construction of the sleeve having a constant bore with constant diameter along its length, and FIG. 5 shows a modified construction of the embodiment in FIG. 4 with respect to the arrangement of securing the spoke ring.

In the illustrative embodiments, the outer casing of the coupling sleeve comprises two joined main sections, namely a nipple sleeve 10 and 10a, which with an inner cylindrical portion 11 forms a guide structure for a cylindrical nipple 12 and 12a, and a connecting sleeve 13 and 13a having an internal thread 14 for connection to a line for fluid under pressure.

In the shown examples the nipple sleeve 10 and 10a is cast in plastic while the connecting sleeve 13 and 13a is made of metal. Arranged on the inside of the sleeve 13 are several annular grooves having a profile which forms several rings with sharp edges 15, which permit the sleeve 13 to be moved to the position shown in FIG. 1 on the somewhat resilient plastic sleeve 10 but which then grip in the plastic material and prevent the sleeve 13 from being drawn back relative to the sleeve 10. This connection may also consist of a conventional thread, as depicted at 15a in FIG. 3, when the sleeve 10a is made of metal. The embodiment illustrated in FIG. 1 is to be preferred, however, in the majority of cases, owing to the ease in which the plastic sleeve can be produced by casting and the rapid assembly of the parts by simply pushing the sleeves 10, 13 axially together, for the purpose of connecting one to the other.

The sleeve 10 and 10a, FIG. 3, is provided with three evenly spaced radial bores 16, in which latching balls 17 are mounted. A locking sleeve 19, which is axially movable on the plastic sleeve 10, against the action of a spring 18, is provided for the purpose of manipulating the balls. The locking sleeve 19 is adapted to hold the balls 17 in a locking position in the position illustrated in FIG. 1, in which the balls engage an annular groove 21 on the nipple 12 to retain the nipple in the sleeve. FIG. 2 shows the locking sleeve 19 in the position in which the balls are located in a radially outer position, to permit insertion of the nipple into the sleeve and the connection to be made.

As previously mentioned, the sleeve 10 and 10a is provided along a portion of its length with an internally cylindrical portion 11 for guiding the nipple 12. The remainder of the interior of sleeve 10 is formed by a cylindrical portion 20 which has a larger diameter relative to the portion 11 and which is adapted to guide an axially movable distance sleeve 22 and 22a, a seal ring 23 made of an elastic material and a support ring 25 which is biassed by a spring 24 and which holds the sealing ring 23 fixed to the end of the distance sleeve 22 and 22a. The sealing ring is suitably of the type generally designated as an O-ring. The distance sleeve 22a can also be divided, as indicated with the parts 22b, 22c in FIG. 3, to facilitate manufacture when working in small diameters.

The junction between the cylindrical portion 20 of larger diameter and the cylindrical portion 11 of smaller diameter can be formed in different ways to provide a first shoulder, which serves as an abutment for a corresponding shoulder 26 on the outside of the distance sleeve 22, whereby the distance sleeve 22 is stopped in a determined end position when the nipple 12 is drawn from the sleeve. A seal must also be arranged at this location, in the form of an O-ring 27 in FIG. 1 and 27a in FIG. 3, to avoid leakage when the nipple is inserted into the sleeve.

In the illustrative embodiment of FIGS. 1 and 2, the first shoulder is formed of an abutment 29 between the cylindrical portions 11, 20. The shoulder 26 of the distance piece bears against the abutment 29 in the manner shown in FIG. 2. The O-ring is mounted in a groove 30 in the cylindrical portion 11 in the vicinity of the abutment 29 and seals against a flange 31 on the nipple 12, as shown in FIG. 1.

Alternatively, the O-ring can be mounted to advantage in the actual junction between the cylindrical portions 20a and 11 (FIG. 3), whereby the first shoulder is formed by the O-ring 27a itself in a groove 30a. In this instance, the cylindrical portion 20a extends up to the groove 30a.

As will be seen from FIGS. 1 and 3, the grooves 30 and 30a accommodating the O-rings 27 and 27a, have been placed very close to the bores receiving the balls, for the purpose of reducing the total length of the coupling sleeve by the greatest possible amount. In actual fact, the groove 30 and 30a slightly overlap the radial ball-receiving bores 16.

Cutting of the groove 30 and 30a for the O-ring is the only mechanical sub-work necessary, with the exception of cutting the bores 16, when manufacturing the cast, plastic sleeve illustrated in FIGS. 1 and 3. Cutting of the groove, however, can be avoided in a simple manner if so desired. This can be accomplished by, for example, causing the cylindrical portion 20a (FIG. 3) to extend up to the ball-receiving bores 16 without providing a groove for the O-ring 27a. In this instance, the diameter of the cylindrical portion 20a is made slightly larger than that shown, to provide space for a relatively thin sleeve which is adapted to take a position between the distance sleeve 22a and the cylindrical portion 20 with its inner end in a fixed position, in which said end bears against the O-ring 27a and is provided with a shoulder to form an abutment for the shoulder 26a on the distance sleeve 22a.

The distance sleeve 22 and 22a is suitably made of metal and has an external cylindrical portion 32 and 32a having a diameter which is approximately equal to the diameter of the cylindrical portion 20 and 20a of the plastic sleeve and being adapted to be guided into said cylindrical portion. The distance sleeve is also provided with an external cylindrical portion 33 and 33a of smaller diameter, which passes with a certain amount of clearance into the cylindrical portion 11, as seen from the figures. One end of the narrower portion 33 and 33a of the distance sleeve is adapted to cooperate with the flange 31 on the nipple 12, as shown in FIG. 1, or direct with the end 34 of the nipple 12a, as shown in FIG. 3.

The other end of the distance sleeve 22 and 22a is provided with a radially inwardly extending bead 35, which forms an abutment surface for the sealing ring 23 and the O-ring respectively. On the other side of the sealing ring 23 there is positioned the support ring 25 which is actuated by the pressure spring 24 to hold the sealing ring fixed to the distance sleeve when the sleeve is moved back and forth inside the coupling sleeve. As will be seen from FIGS. 1 and 3, the inner diameter of the sealing ring is slightly less than the inner diameter of the support ring 25 and the bead 35 of the distance sleeve.

The other end of the spring 24 bears against a ring 36 which is securely clamped between the inner end 37 of the sleeve 10 and an internal abutment 38 of the sleeve 13 behind its thread 14. The ring 36 presents a number of radial spokes 39, four in the illustrative embodiment. The cross-sectional shape of the spokes is shown by the shaded profile in the figures, and the spokes have an obtuse end edge surface 40, slightly converging sides and a second, pointed edge surface 41. The ring 36 is provided with a substantially cylindrical projection 42, which forms a guide structure for the spring 24. The projection 42 tapers slightly outwardly and merges into a widely flared mouth 43 for the purpose of reducing flow losses.

The spokes support a centrally arranged, axial stem 44, which extends through the support ring 25 and beyond the sealing ring 23, and passes at its free end into a valve head 45 of the shown construction, for example. The stem 44 is substantially cylindrical in shape.

The valve head is essentially in the form of two opposing cones 46, 47 which are provided at their outer common edge surface with an annular surface which forms a valve seating 48 for cooperation with the sealing ring 23 when the distance sleeve occupies the end position shown in FIG. 2. In this position the sealing ring 23 closes the passage between the sleeve 10 and the valve head 45.

In the exemplary embodiment of FIG. 1, the ring 36, the spokes 39, the stem 44 and the valve head 45 are made in one piece, by casting the same in a plastic material, while the valve head 45a in FIG. 3 is joined to the stem 44a by means of a thread 55.

For the purpose of reducing the resistance to flow, the distance sleeve 22 and 22a behind the bead 35 widens into an intermediate portion 49 of relatively small wall thickness.

If relatively short nipples 12a are used, of the same construction as shown in FIG. 3 or similar, with a straight through-flow passage, the valve head can be provided with a rounded end, for example, such as that shown by the dot-dash lines 50 in FIG. 3, to further reduce the resistance to flow. The inner edge surface 51 of the end of nipple 12a is suitably chamfered, as shown in FIG. 3.

The flow conditions obtained when using the known nipple 12 shown in FIG. 1, which presents a side hole 52 and the open end of which is positioned relatively close to the valve head 45 are superior to the conditions obtained with the coupling sleeve for which the illustrated nipple is actually intended, namely a coupling sleeve having a ball which coacts with a valve seat and which is moved to a free position by the cup-shaped end 53 of the nipple. Deviation of the flow of pressure medium around the valve head 45 causes acceptable losses and the flow through the coupling sleeve can on the whole be said to be straight. Better flow conditions are obtained, however, with the nipple 12a illustrated in FIG. 3.

The widest outer diameter of the valve head 45 lies at the surface forming the valve seating 48 and is smaller than the inner diameter of the bead 35 of the distance sleeve and the inner diameter of the support ring 25, so that the valve head 45 can be moved passed said elements in either direction.

The described component parts are assembled in the following manner. The O-ring 27 and 27a is first mounted in position in the sleeve 10, whereafter the locking sleeve 19 and the spring 18 are placed on said sleeve. The distance sleeve 22 and 22a, the O-ring 23, the support ring 25 and the spring 24 are then inserted in position, still from the same direction, i.e., in practice from above downwards. The valve head 45 is then moved through the support ring 25, the O-ring 23 and passed the bead 35, so that the ring 36 bears against the end 37 of the sleeve 10. In this position the ring is pressed fast with the abutment 38 of the connecting sleeve 13, which as the last part has been placed on the plastic sleeve 10 and fixed in position, by the action of its knife rings 15 biting in the outside of the plastic sleeve.

As previously mentioned, the sleeve 10 and 10a may also be made of metal, for instance when the coupling is to be used for a fluid which attacks plastic materials. The ring 36, the spokes 39, the stem 44 and the valve head 45 may also be made of metal and may comprise at least two separate elements which are joined together as by riveting, pressing, gluing or by screw threads for example, as shown by the threads 55 in FIG. 3.

FIG. 4 shows a simplified embodiment in which the sleeve 60 is made in one piece and has a cylindrical bore 61 extending with a constant diameter along its length to the abutment 38a for the spoke ring 36a. In this embodiment, the spoke ring 36a is axially locked merely by means of the spring 24a, and thus this locking arrangement may be used as long as the pressure of the pressure medium is not greater than the spring 24a may overcome the action of the pressure medium when the sealing ring 23 is in its sealing position, FIG. 5. The locking of the spoke ring 36a in FIG. 4 in combination with the sleeve 60 made in one piece, will favorably reduce the number of operations necessary in the manufacture. The embodiment in FIG. 4 or 5 may be selected as a preferred embodiment when the diameter of the sleeve is relatively small and/or when the pressure medium has a relatively low pressure.

The distance sleeve 62 in FIG. 4 is further modified because it has no shoulder 26 and 26a as in FIGS. 1 and 3. Instead the distance sleeve 62 rests with its end 63 against a sealing ring 64 of elastic material which on its opposite side is in contact with a locking sleeve 65. This sleeve is formed with a shoulder 65a which to its function corresponds to the shoulder 26 and 26a, respectively, and is provided to engage the locking balls 17 according to FIG. 5 when the nipple 12b has been withdrawn.

The nipple 12b has a sleevelike end portion 66 which extends through the sealing ring 64 and rests against the end of the distance sleeve 62 in order to hold the distance sleeve in its inner end position as shown in FIG. 4. The locking sleeve 65 rests against an abutment 67 on the nipple in such a position that a predetermined space is maintained between the sleeve 62 and the sleeve 65 for obtaining a desired compressing action on the sealing ring in order to obtain the necessary sealing. The sealing effect will be obtained before the sealing ring 23 leaves its sealing position, according to FIG. 5.

The embodiment in FIG. 5 differs from that in FIG. 4 in that the spoke ring 36a is axially locked between the abutment 38a and a locking ring 69 which is located in a groove behind an inner flange 68 adjacent the inner end of the bore 61. Alternatevely, the locking ring 69 may comprise the last turn of the spring 24b which then has a somewhat greater diameter than the other turns of the spring.

The spoke ring 26 may alternatively be secured axially by means of an adhesive.

What I claim is:

1. A coupling device adapted for coupling engagement with a nipple 12 to form a quick-coupling between two gas or liquid carrying conduits, comprising:

a coupling sleeve 10 having a cylindrical bore 20 therein, said coupling sleeve 10 receiving said nipple 12 at one end thereof;

locking means 17 in the nipple receiving end portion of said coupling sleeve 10 for locking the nipple 12 in its inserted position in said coupling sleeve 10;

a spoke ring 36 mounted within said coupling device, said spoke ring 36 having a number of spokes 39 radially extending therefrom for supporting a stem 44;

a valve head 45 extending from said stem 44 within said coupling sleeve 10 and toward said nipple receiving end of said coupling sleeve 10;

a distance sleeve 22 slideably mounted within the cylindrical bore 20 of said coupling sleeve 10 and being axially displacable in said coupling sleeve 10 between two end positions, the first end position being a sealing position of the distance sleeve 22 when a nipple 12 is not fully inserted in said coupling device, and said distance sleeve being movable by insertion of the nipple 12 to the second end position which is an open position achieved upon insertion of a nipple 12 in said coupling sleeve 10, said distance sleeve 10 having an internal diameter at the end 35 thereof adjacent said valve head 45 at least equal to the external diameter of said valve head 45 so that said end 35 of said distance sleeve 10 is freely movable over said valve head 45;

a compression spring 24 in said bore 20 of said coupling sleeve 10 and interposed between the spoke ring 36 and said distance sleeve 22 for biasing said distance sleeve 22 toward its first end position toward the nipple receiving end of said coupling sleeve 10;

an elastic sealing ring 23 movably mounted in said bore 20 of said coupling sleeve 10 and sealingly bearing against the inner surface of said bore 20, said sealing ring 23 being interposed between said compression spring 24 and said distance sleeve 22 the spring biasing said sealing ring 23 against the distance sleeve 22 in sealing relation therewith, said sealing ring 23 sealingly engaging the valve head 45 when said distance sleeve 22 is moved toward said nipple receiving end of said coupling sleeve 10 to assume its sealing position, said sealing ring being disengaged from said valve head 45 when said distance sleeve 22 is moved, under the action of the inserted nipple 12, toward its second end position, so that gas or liquid may flow freely and pass between the valve head 45 and the distance sleeve 22, said elastic sealing ring 23 both sealing against the valve head 45 in one position and simultaneously sealing the distance sleeve 22 with respect to said coupling sleeve 10.

2. The coupling device according to claim 1 including an annular support ring 25 movably mounted in said bore 20 of said coupling sleeve 10 and interposed between said compression spring 24 and said sealing ring 23.

3. The coupling device according to claim 1 including a connecting sleeve 13 having an internal connecting thread 14 along a portion of its length, and a widened cylindrical portion adjacent the threaded portion and which is adapted to be inserted over one end 37 of the coupling sleeve 10 said connecting sleeve 13 having an abutment 38 on the inside thereof between the end 37 of the coupling sleeve 10 inserted therein and the threaded portion 14 thereof, said spoke ring 36 being interposed between said abutment 38 and the end 37 of the inserted coupling sleeve 10 to clamp said spoke ring 36 in position.

4. The coupling device according to claim 1 wherein the spoke ring 36, spokes 39, stem 44 and valve head 45 are one integral piece.

5. The coupling device according to claim 1 wherein the sealing ring 23 bears directly against the inside of the bore 20 of the coupling sleeve 10 and is retained securely against the adjacent end of the distance sleeve 22.

* * * * *